United States Patent Office 3,211,138
Patented Oct. 12, 1965

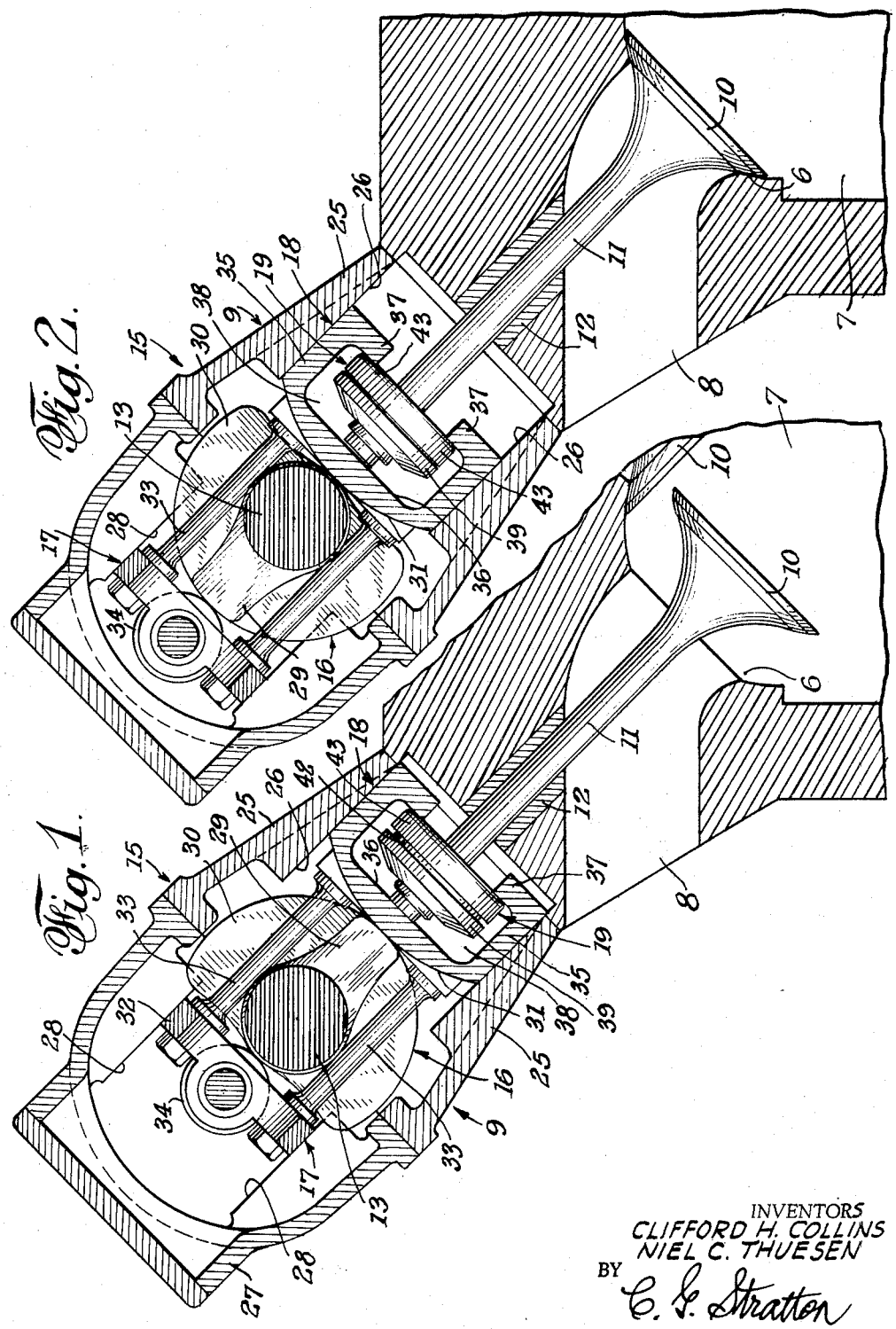

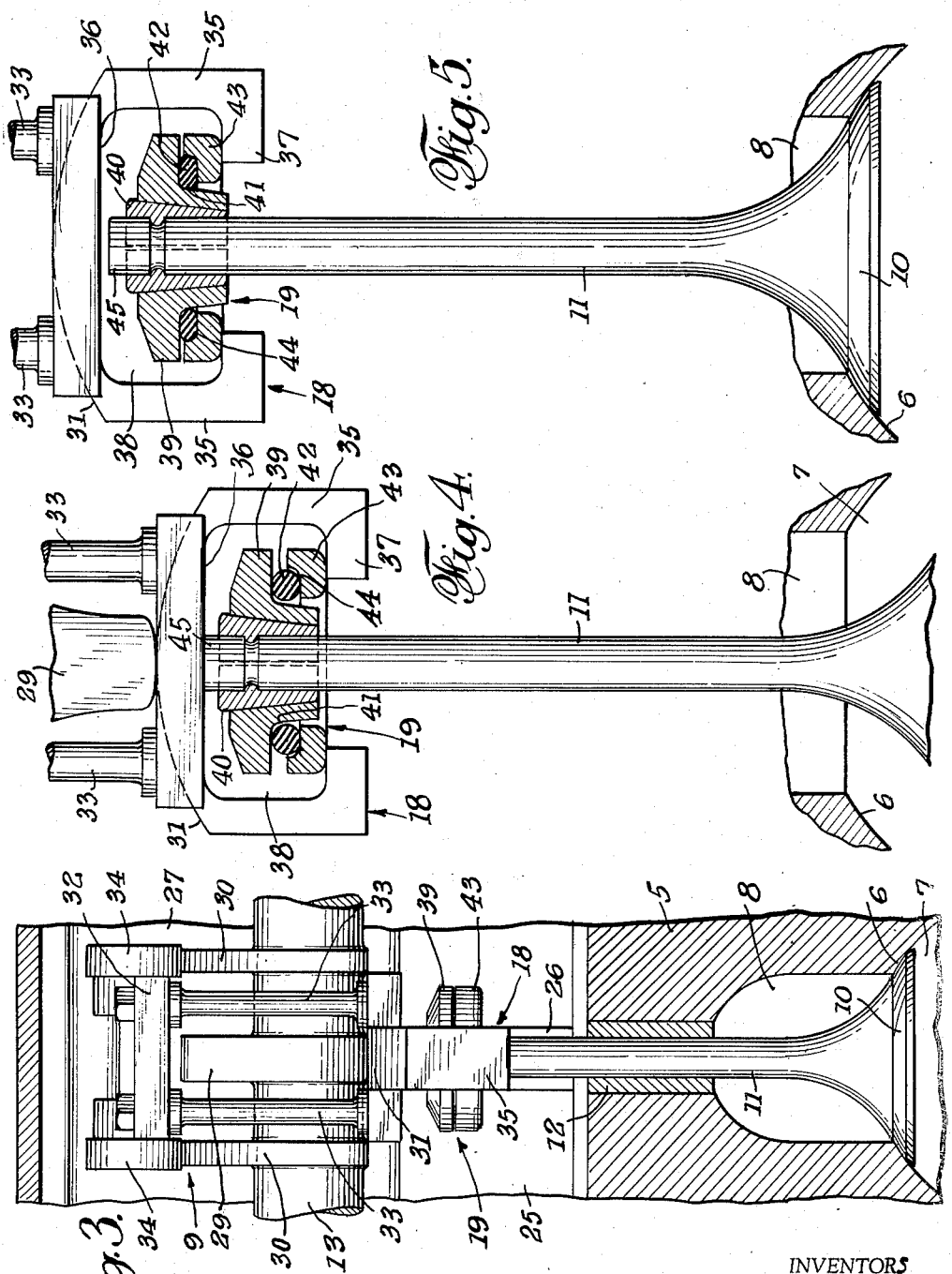

3,211,138
POPPET VALVE MECHANISM
Clifford H. Collins, 819 De La Fuente, Monterey Park, Calif., and Niel C. Thuesen, 3559 E. Gage Ave., Bell, Calif.
Filed Dec. 30, 1963, Ser. No. 334,417
7 Claims. (Cl. 123—90)

This invention relates to mechanism for controlling opening and closing of the poppet valves of internal combustion engines, and for other uses, such as in air compressors for opening control valves therefor and for holding such valves closed against stored pressure.

Conventional poppet valve mechanisms employ cam shafts that, through operation of rocker arms, open the poppet valves of an engine, springs being provided to carry out return movement that closes the valves. Hence, only the opening movement of the valves is positively controlled. Moreover, the springs introduce a time lag in the operation, in addition to being impositive in operation. Further, such springs impose a load that requires expenditure of power to overcome, and also are a source of friction buildup in the valve movement.

A general object of the invention is to provide poppet valve mechanism that, by eliminating spring control during movement of the valve in one direction, provides an operation that is carried out with minimum power expenditure, since the control is substantially power-balanced through the entire operation cycle.

Another object of the present invention is to provide control means that is positive in operation both when opening and when closing poppet valves.

A further object of the invention is to provide poppet valve control mechanism as characterized above that, while employing means to positively close the valve, provides also for compression compensation at the end of the valve-closing movement, thereby insuring tight valve closure irrespective of pressure differentials on both sides of the valve.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, and which is based on the accompanying drawings. However, said drawings merely show, and the following description merely describes, one embodiment of the present invention, which is given by way of illustration or example only.

In the drawings, like reference characters designate similar parts in the several views.

FIG. 1 is a vertical sectional view of poppet valve mechanism according to the invention and shown in a valve-open position.

FIG. 2 is a similar view showing the mechanism in a valve-closed position.

FIG. 3 is a vertical sectional view of the mechanism, as in FIG. 2, taken at right angles to the latter view.

FIGS. 4 and 5 are enlarged sectional and detail views showing valve-movement compression compensating means as in FIGS. 1 and 2, respectively.

The drawings show a portion of a cylinder block 5 of an internal combustion engine or the like, a valve seat 6 in said cylinder block for communicating, when open, the cylinder chamber 7 and a flow passage 8 that may be an intake or exhaust passage. The present mechanism 9 is mounted on said cylinder 5, the same controlling reciprocative movement between open and closed positions of a poppet valve 10 on the end of a stem 11 that is guided in a bushing or guide 12 in the cylinder block 5. An overhead cam shaft 13 is shown in operative association with said mechanism 9, it being clear that said shaft controls a plurality of valves 10 in aligned arrangement along the cylinder block 5.

The poppet valve mechanism 9 that is illustrated comprises, generally, a guide housing 15 affixed to the cylinder block 5 and through which the cam shaft 13 extends, cam means 16 provided on said cam shaft in centered relation, as in FIG. 3, with respect to the valve 10, a cage 17 operatively associated with said cam means 16 and reciprocated thereby in the guide provided by the housing 15, said cage being provided at its lower end with a tappet portion 18, and means 19 mounted on the valve stem 11 and engaged with the tappet portion 18 for providing compression compensation for the closing movement of the poppet valve, as controlled by the cam means 16.

The guide housing 15 is shown as having side walls 25 that are provided with slide guides 26 for the tappet portion 18 of the cage 17. Said walls 25 mount an overhead housing part 27 that is provided with opposed slide guides 28 for the upper portion of said cage 17.

The cam means 16 comprises complementary or reciprocal cams 29 and 30, the cam 29 comprising a valve-opening cam that is centered on the valve stem 11, and a pair of control cams, one on each side of the cam 29, as can best be seen in FIG. 3.

The cage 17 comprises a lower part that is the tappet part 18, the same having a surface 31 that is engaged by the lobe or rise of the cam 29 to cause the cage to move in a direction toward the valve seat 6. Said cage 17, on the opposite side of the tappet part 18, is provided with a frame 32 that is guided by the slide guides 28 and is connected to the tappet part by a set of four rods 33 straddling the cam shaft, two on each side of the cam 29 between said cam and one of the control cams 30. Said frame 32 mounts a pair of cam followers 34 that are engaged with the cams 30 so the rises of said latter cams cause the cage 17 to move in a direction away from the valve seat 6.

The above-described complementary or reciprocal cams cooperate so that the lobe of the valve-opening cam 29 is effective, through part of the cam cycle, to move the cage in a valve-opening direction while the cams 30 maintain a control contact with the followers 34, and so that the lobes of the two control cams 30 are effective, through the remainder of the cam cycle, to move the cage in a valve-closing direction.

The tappet portion 18 of the cage 17 is formed to have side slide walls 35 that are engaged by the slide guides 26, an end wall 36 connecting the side walls 35, and a pair of ledges 37 provided on the walls 35 and opposite to each other, one on each side of the valve stem 11, and longitudinally spaced from the wall 36. A space 38 is defined by the walls 35 and 36 and the ledges 37.

The compression-compensating means 19 is shown as occupying the space 38 and clear of walls 35, as comprising a washer ring 39 affixed to the end of the valve stem 11 (which is clear of the cage ledges 37), as by a split collet 40, said ring being provided with a seat 41 for a compressible, non-metallic O-ring 42, and a washer ring 43 in support engagement with the ledges 37 of the tappet portion 18 and provided with a seat 44 for the O-ring 42 and which is opposed to the seat 41 of the ring 39.

The stem 11 is so connected to the ring 39 as to bring the end 45 of said stem into direct contact with the wall 36 of the tappet portion 18, when the ring 42 is under little or no compression. This condition is shown in FIGS. 1 and 4, it being clear that the wall 36, when the cage 9 is being moved by the lobe of cam 29, pushes directly on said stem end 45 to cause positive opening movement of the valve 10. As can be seen from the several views, the structure is such that accurate alignment of the longitudinal center of the cage and of the axis of the valve stem 11 is not necessary for a proper operation of the mechanism, due, mainly, to the loose fit of the means 19 in space 38, and the fact that the valve stem 11 is guided only by its bushing 12.

As can be seen in FIGS. 2 and 5, when the lobes of the cams 30 engage the followers 34, the ledges 37 move the means 19 away from the valve seat 6, causing the valve to be moved toward seat-engagement. The length of the valve stem is arranged so that when the valve reaches seating engagement, the lobes of the cams 30 are yet in the process of moving the cage 17 in a direction away from the valve seat. As a consequence, the valve 10 ceases to move, causing the ring 42 to become compressed between the rings 39 and 43 and, in the process, causing a separation, as shown, between the wall 36 and the stem end 45. The compression of the O-ring creates a resilient force that firmly draws the valve 10 into fully seated position against the valve seat 6, this force constituting the only bias on the valve that requires use of power, the same being quite small and effective only at the instant of valve closing. At all other times, the cams 29 and 30 exert balancing forces that minimize friction, wear and inertia, and yet provide a positive type of valve movement, as above described.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. Mechanism for controlling the movement of a poppet valve relative to a valve seat therefor in an engine block, said valve having a stem guided in said block, comprising:
   (a) a rotational cam shaft,
   (b) a cage provided with opposed cam-engaging portions, one on each side of said cam shaft,
   (c) a housing around said cage provided with slide guide means for the cage independent of the guide for the stem,
   (d) complementary cam means on said shaft to alternately engage said cage portions to reciprocate said cage toward and from the valve seat,
   (e) said cam means having reciprocal portions to control such movement during the mentioned alternate engagement of the cams, and
   (f) compressible means wholly carried by the valve stem and engaged with the cage to compress during the final portion of movement of the cage away from the valve seat after the valve has been seated, said stem having an end engaged with the cage,
   (g) the engagement between the cage and the stem and between the cage and the compressible means being an axial abutment connection.

2. Mechanism according to claim 1 in which the cage portion located between the cam shaft and the valve seat is provided
   (a) with a wall normally engaged by the end of the valve stem, and
   (b) with ledge means spaced from said wall,
   (c) the compressible means being supported by said ledge means and disposed in the space between the same and said wall.

3. Mechanism according to claim 1 in which the compressible means comprises
   (a) a ring washer affixed to the stem,
   (b) a loose ring washer between the fixed washer and the ledge, and
   (c) a compressible O-ring between the washers which, when expanded, biases the fixed washer in a direction to abut the end of the valve stem against the mentioned wall, and which, when compressed during engagement of the valve with its seat, allows the stem end to become spaced from said wall.

4. In mechanism for controlling movement of a poppet valve relative to its seat in an engine block, and having a stem guided for said movement in the block,
   (a) a cam shaft,
   (b) complementary cams on said cam shaft, on zero angular phasing,
   (c) a unit engaged with the stem of the poppet valve and provided with opposed portions to be engaged by said complementary cams alternately on 180° angular phasing,
   (d) slide guide means for said unit independent of the guide for the stem,
   (e) resilient means interposed between said unit and the valve to compress when the valve approaches seated condition,
   (f) said latter means being carried by the end of the valve stem, said stem end being engaged with the unit,
   (g) the engagement between the unit and the stem and between the unit and the resilient means being an axial abutment connection.

5. Mechanism for controlling the movement of a poppet valve relative to a valve seat in an engine block, said valve having a stem and said block having a guide for said stem, comprising:
   (a) a cage provided with opposed cam-engaging portions,
   (b) slide guide means for the cage independent of the guide for the stem,
   (c) complementary cam means comprising a cam lobe to engage one of said portions to move the cage in a direction toward the valve seat and to control movement of the cage in a direction away from the valve seat, and control cams reciprocal to the cam lobe to engage the other of said portions to move the cage in a direction away from said valve seat during control of said movement by the cam lobe and to control movement of the cage in a direction toward the valve seat during movement by the cam lobe of the cage away from the valve seat,
   (d) means provided on said cage and engaged with the valve stem to move the poppet valve, accordingly, relative to the valve seat, and
   (e) resilient means wholly carried by the stem to compress and allow completion of the movement of the cage away from the valve seat after the valve has been seated.
   (f) the means providing the engagement between the cage and the stem, and the engagement between the cage and the resilient means, constituting axial abutment connections.

6. In combination,
   (a) a poppet valve having a stem guided in a block with the stem extending outwardly through said block,
   (b) a housing affixed to the block and into the interior of which the valve stem extends,
   (c) longitudinal guide means in said housing independent of the guide for the stem,
   (d) a cage mounted to slide on said guide means in a path parallel to the axis of the valve stem,
   (e) said cage being provided with cam-engaging portions, one on one side of said shaft and one on the other side, (f) a cam shaft extending transversely through the housing and cage and provided with complementary cams, one in constant engagement with one cage portion and the other in constant engagement with the other cage portion, said cams being phased around the axis of the shaft to slidingly move the cage and the valve in opposite directions alternately, (g) the valve stem having an end engaged with the cage, and (h) compressible means wholly carried by the valve stem adjacent said end and engaged with the cage to cause movement of the valve with the cage during movement of the latter, (i) said compressible means and the cage being arranged to cause compression of said means and allow completion of the movement of the cage away from the valve seat after the valve has been seated, (j) the engagement between the cage and the stem and between the cage and the compressible means being an axial abutment connection.

7. The combination of claim 6 in which the cage, in its end directed toward the valve seat, is provided with a transverse wall and a pair of longitudinally spaced ledges spaced from said wall, the compressible means being disposed in said space and, on movement of the cage away from the valve seat, being compressed by said ledges after valve seating.

References Cited by the Examiner
UNITED STATES PATENTS

| | | | |
|---|---|---|---|
| 1,074,121 | 9/13 | Kelly | 123—90 |
| 1,410,787 | 3/22 | Wells | 123—90 |
| 1,493,419 | 5/24 | Asbury | 123—90 |
| 1,869,919 | 8/32 | Seabrook | 123—90 |
| 2,378,726 | 6/45 | Peters | 123—90 |

FRED E. ENGELTHALER, *Primary Examiner.*